Apr. 3, 1923.
S. J. LUCAS
1,450,296
LEVEL ATTACHMENT FOR CARPENTERS SQUARES
Filed Feb. 23, 1922
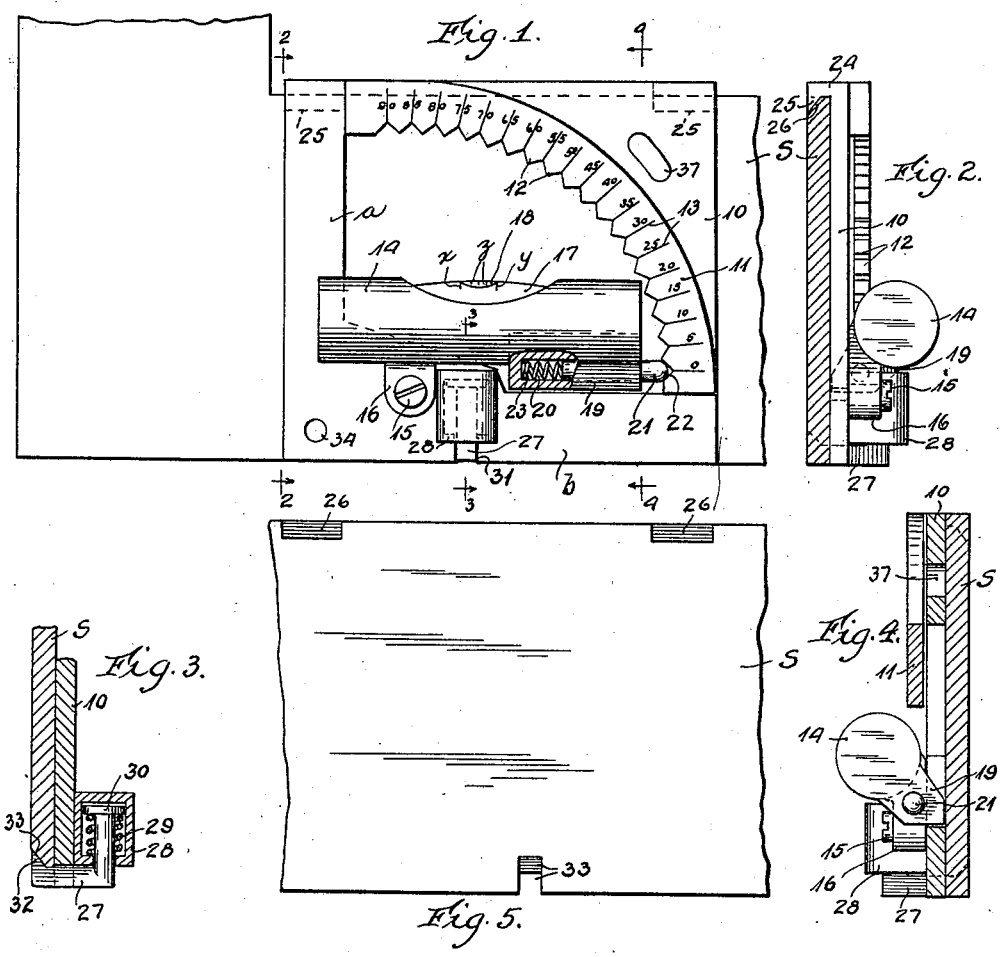
Inventor,
Stephen J. Lucas
By Charles J. Schmidt
Atty.

Patented Apr. 3, 1923.

1,450,296

UNITED STATES PATENT OFFICE.

STEPHEN J. LUCAS, OF CHICAGO, ILLINOIS.

LEVEL ATTACHMENT FOR CARPENTERS' SQUARES.

Application filed February 23, 1922. Serial No. 538,436.

*To all whom it may concern:*

Be it known that I, STEPHEN J. LUCAS, a citizen of the United States, and a resident of Chicago, county of Cook, and State of Illinois, have invented certain new and useful Improvements in Level Attachments for Carpenters' Squares, of which the following is a specification.

My invention relates to a level attachment for carpenters' squares which can be readily applied to one of the legs of the square so that such leg may be used as a level, or so that the square with the attachment thereon, which is adjustable, may be used in the determination of desired angles.

One of the important objects of the invention is to provide for improved adjustment of the spirit level forming part of the attachment so that adjustment for the measurement of desired angles can readily be effected. Another important object is to provide for simple accurate and detachable application of the attachment to the square so that accurate measurement may be accomplished. Another important object is to provide for such attachment to a steel square that the square may lie down flat, and also have its edges clear to be used without interference for measuring or ruling. Another important object is to adapt the level device for accurate attachment to a support such as board, beam, or straight edge so that such support may be used as a level.

The above and other features of my invention are shown incorporated in the structures shown on the accompanying drawing, in which Fig. 1 is a plan view of the leveling attachment applied to a carpenter's steel square.

Fig. 2 is an end elevational view of plane 2—2 Fig. 1,

Fig. 3 is a sectional view on plane 3—3 Fig. 1,

Fig. 4 is a sectional view on plane 4—4 Fig. 1,

Fig. 5 is a rear view of the section of the steel square to which the attachment is applied, and Fig. 6 is a plan view showing the attachment applied to a board or beam.

Describing first the attachment, it comprises a base 10 which may be rectangular as shown, and which has the quadrant raised section 11 along whose inner edge are the teeth 12 regularly spaced between the division lines 13 of a scale ranging from 0 to 90 degrees. The teeth extend along the arc of a circle at whose center is pivoted the spirit level frame 14 by means of a screw 15 extending through the lug 16 on the frame and threading into the base 10. Within the frame 14 is secured the glass container 17 which contains the liquid for providing the bubble 18. At its outer end the frame 14 has the lug 19 secured thereto, and this lug and the lug 16 may be integral with the frame 14 which may be in the form of a casting. The lug 19 has the cylindrical bore or passageway 20 for receiving the pawl pin or plunger 21, this pin as shown having the rounded end 22 for engaging in the notches between the teeth 12, the pin being urged yieldingly outwardly by the compression spring 23 between the inner end of the pin and the inner end of the passageway 20. To receive the lug 19 and also to lighten the structure, the base 10 is left open between the quadrant 11 and the walls *a* and *b*, the lug 19 extending through the open space to permit the pin to be applied between any of the teeth, depending upon the angle desired. Preferably the base of the lug 19 is flat and in the plane of the inner face of the base 10, so that when the attachment is applied to a carpenter's square the lug may have bearing on such square to assist in supporting the spirit level structure. Preferably the lower edge of the base 10 is straight and parallel with the axis of the bubble glass 17 when the pin 21 is in the first notch opposite the indication 0. The device can then be used alone for leveling purposes or for determining angles.

To adapt the device for application to a steel square, the base 10 is provided at its top with rearedly extending brackets 24 for engaging around the upper edge of the square. Preferably the brackets terminate in triangular points or ends 25 for engaging in the beveled notches 26 which can readily be filed or otherwise formed at the edge of the square. I have shown the device applied to the long leg of the square S and in Fig. 5, I show the beveled notches 26 formed at the upper edge of such leg.

For securing the base 10 to the square at its lower edge I preferably provide a latch member 27 which is of L-shape. The vertical limb of the latch member extends into a frame 28 secured on the base 10 providing a compartment for the compression spring 29 which surrounds the latch member and abuts against the head 30 thereon and the base of the frame 28. Below the frame 28 the base 10 has the notch 31 for receiving the horizontal limb of the latch member, such limb terminating at its end in the upwardly extending triangular point or tooth 32 for engaging in the beveled notch 33 provided at the lower edge of the square. When the latch member is swung to engage in the notch 31 and with its end 32 in the beveled notch 33, that attachment will be rigidly locked to the square. The upper brackets 24 are first hooked around the upper edge of the square and then the latch member is pulled downwardly sufficiently to clear the lower edges of the base and square and is then released to permit the spring to draw the horizontal limb into the notch 31 and the end 32 into the square notch 33. By virtue of the beveled engagement of the brackets and latch member with the square edge there will be no interference with the laying of the square flat against any surface. When the attachment is applied to the square and the pawl 21 is in the notch opposite the "0" division, the lower edge of the square will be parallel with the axis of the bubble glass 17, and the limb to which the attachment is applied can then be used for ordinary leveling purposes. By rotating the spirit level structure the attachment and square will cooperate for the determination of any desired angles, pitch, etc.

I have shown the piece 12 extending through an arc of 90 degrees and have divided this arc into five degree steps, so that the advance of the pawl pin from one tooth to the next will be analogous to the advance of 5 degrees. It is evident that the full 91 teeth could be provided so that the spirit level structure could be advanced or swung through one degree and locked by the pawl pin. I have, however, shown the space between the center lines $x$ and $y$ on the glass 17 for the bubble 18 to be divided into four equal divisions by the lines $z$. These divisions will cooperate with the 5 degree step division to obtain any degree setting of the spirit level. To illustrate the operation, suppose that it is desired to determine an angle of 5 degrees with some horizontal surface, the angle opening to the left. The spirit level structure is rotated until the pawl point comes in the notch opposite the line indicating 5 degrees. The right end of the square is then rested on the surface and the left end of the square is raised until the bubble comes between the centering lines $x$ and $y$, and the lower edge of the square will then be at an angle of 5 degrees with reference to the horizontal surface. If a 6 degree angle is desired the square is raised a little higher at its left end until the right end of the bubble is at the first division $z$ just to the left of the centering line $y$. If a 9 degree angle is desired the square would be swung until the right end of the bubble is coincident with the centering line $x$. With this arrangement the quadrant 11 of the device can take care of any progression of angles while the divisions of the level glass will take care of the intermediate angles.

In Fig. 6 I have shown the device applied on a wooden board or beam E which is to be used as a leveling instrument. The base 10 is applied to the beam with its brackets 24 over the top thereof, or if desired notches can be cut in the beam to receive the brackets. A screw 34 is then applied through the circular opening 35 to serve as a pivot around which the base 10 can be adjusted until the base of the board is parallel with the axis of the bubble glass. The set screw 36 passing through the slot 37 is then secured and the screw 34 is also tightened, whereafter the base 10 will be rigidly held in accurate position on the board, which board can then be used for leveling or other purposes. During application of the device on a board or beam the latch member 27 is swung with its horizontal member against the front of the base 10 as clearly shown in Fig. 6, it being then out of the way.

The device is of such shape and size that it can be readily carried in the pocket until it is desired to be used in conjunction with a square or straight edge to which it can be readily applied in the manner described. The base with the quadrant thereon can be cast or formed up of sheet metal.

Having described my invention, I claim as follows:

1. The combination with a carpenter's square, of a leveling attachment, said attachment comprising a base, brackets extending from the top of said base and having triangular ends, there being beveled notches at the upper edge of the square for receiving said triangular ends, a latch member at the lower end of said base having a triangular end, said square having a beveled notch at its lower edge for receiving said triangular end of the latch member, a spirit level pivoted on said base, and a degree indicating scale on said base with which said level cooperates to indicate angles.

2. The combination with a carpenter's square, of a leveling attachment, said attachment comprising a base, brackets extending from the upper edge of said base and having beveled ends, the rear edge at the top of said square having beveled notches in which said beveled ends engage, a spring latch member at the lower part of said base having a beveled end, the rear edge at the bottom of said square having a beveled notch for receiving said beveled latch end, a notch in the lower end of said base for receiving said latch, a spirit level pivoted on said base, and means for locking said level in adjusted positions of angularity with reference to the bottom edge of the square.

In witness whereof, I hereunto subscribe my name this 17th day of February A. D., 1922.

STEPHEN J. LUCAS.